UNITED STATES PATENT OFFICE.

CARL LUDWIG MÜLLER, OF LUGWIGSHAFEN-ON-THE-RHINE, ASSIGNOR TO THE BADISCHE ANILIN AND SODA FABRIK, OF MANNHEIM, GERMANY.

YELLOW DYE.

SPECIFICATION forming part of Letters Patent No. 430,535, dated June 17, 1890.

Application filed April 3, 1890. Serial No. 346,442. (Specimens.) Patented in Germany August 31, 1888, No. 46,737, and January 13, 1889, No. 47,902, and in England October 23, 1888, No. 15,258.

*To all whom it may concern:*

Be it known that I, CARL LUDWIG MÜLLER, a subject of the King of Bavaria, residing at Ludwigshafen-on-the-Rhine, in the Kingdom of Bavaria and Empire of Germany, have invented new and useful Improvements in the Manufacture of a new Substantive Yellow Dye-Stuff, (for which Letters Patent were obtained in Germany, No. 46,737, dated August 31, 1888, and No. 47,902, dated January 13, 1889, and in Great Britain, No. 15,258, dated October 23, 1888,) of which the following is a specification.

This invention relates to the manufacture of a new dye-stuff which dyes unmordanted cotton in the alkaline bath a pure yellow color, and which can also be used for dying and printing animal fiber. The said dye-stuff belongs to the class of disazo compounds—that is to say, it contains the N N group twice; but I produce it by means entirely different from those known and used in the production of dye-stuffs of the said class before the date of this invention—namely, by coupling together two molecules of a paramidoazo compound by means of a suitable intermediary. Thus to produce my new yellow dye-stuff I couple together two molecules of paramido-benzene salicylic acid by the aid of phosgene.

The above-named paramido-benzene azo salicylic acid may be produced by reducing the paranitro-benzene azo salicylic acid, as shown by Meldola, (*Journal of the Chemical Society*, Vol. 47, page 667,) or the amido-diazo benzene of Griess (*Berichte der Deutschen Chem., Gesellschaft* XVII, 603) may be combined with salicylic acid; but it is preferable to take diazo-acetanilide (*Nietzki Berichte der Deutschen Chemischen Gesellschaft* XVII, 343) and to operate in accordance with the following example, which illustrates more particularly the manner in which my invention may be carried into effect, the parts throughout being by weight: About fifteen (15) parts of finely-powdered acetyl-para-phenylene-diamine (paramidoacetanilide) are dissolved in a mixture of about forty-five (45) parts of hydrochloric acid (containing about thirty-two per cent. of true acid HCl) and about two hundred (200) parts of water and about two hundred (200) parts of ice are added. Then about seven (7) parts of nitrite of soda dissolved in about twenty-one (21) parts of water are added and stirred or agitated for about an hour. The solution of the diazo-acetanilide thus obtained in the well-known manner is allowed to run slowly into a solution of about fifteen (15) parts of salicylic acid and about forty-five (45) parts of calcined soda in about three hundred (300) parts of water, and about one hundred and fifty (150) parts of ice are added to prevent undue rise of temperature. After standing for about twenty-four hours the crystalline azo compound, which has separated out, is collected upon a filter and well pressed.

To eliminate the acetyl group, the product obtained is without drying introduced into about two hundred (200) parts of ordinary concentrated or rectified sulphuric acid, and the mixture is heated on the boiling-water bath for about four hours. The product, when cold, is run slowly into cold water, and the amido-azo compound, which separates out as a fine brown crystalline powder, is collected on a filter. Now, in order to convert this product into my new yellow disazo dye-stuff in accordance with my invention, the said product is well mixed with about one thousand (1,000) parts of water, preferably in a large lead-lined vessel, and then by carefully adding a solution of soda or of caustic soda until it shows a slightly-alkaline reaction converted into its sodium salt. The mixture is well stirred, and after the addition of about seven hundred (700) parts of ice a current of phosgene gas passed in or liquid phosgene added until the whole assumes an acid reaction. A brown precipitate of the coloring-matter in the insoluble form of a free or uncombined acid separates out and is filtered and pressed, and then, in order to convert it into its commercial or mercantile form of a soluble sodium salt, it is well mixed with sufficient calcined soda for that purpose and dried on the water bath.

The dye-stuff thus obtained is chemically a sodium salt of an acid, the constitution of which is represented by the formula

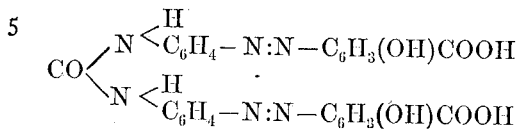

and which is therefore to be regarded from its constitution as a disazo combination of two molecules of salicylic acid with one molecule of symmetrical diamido-diphenylurea.

The dye-stuff is characterized by the following properties: It is a dull yellow powder soluble in water and alcohol, giving yellow solutions, the addition of hydrochloric acid to the aqueous solution produces a dark-red brown precipitate, while caustic soda turns the aqueous solution an orange-yellow color. The dye-stuff is soluble in concentrated sulphuric acid yielding a solution of orange-red color, from which water throws down a brown precipitate. By dyeing unmordanted cotton in the boiling alkaline or soap bath, a very pure shade of yellow can be obtained with this dye-stuff.

Now what I consider new, and therefore claim, is—

As a new article of manufacture, the hereinbefore-described yellow substantive dye-stuff, which is chemically a sodium salt of an acid, the constitution of which is represented by the formula

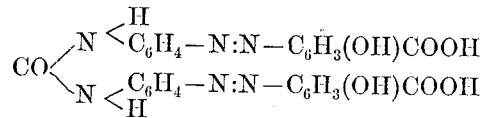

and which is to be regarded from its constitution as a disazo derivative of symmetrical diamido-diphenylurea, and which dye-stuff is further characterized by the following properties: it is a dull yellow powder soluble in water, alcohol, and sulphuric acid, the aqueous and alcoholic solutions being of a yellow color; from the former hydrochloric acid throws down a dark-red brown precipitate, while caustic-soda solution turns it an orange-yellow color; the sulphuric-acid solution is orange-red in color, and water throws down from it a brown precipitate, and the dye-stuff dyes unmordanted cotton in the boiling alkaline or soap bath a pure yellow color, all substantially as hereinbefore described.

In testimony whereof I have hereunto set my hand in the presence of two subscribing witnesses.

CARL LUDWIG MÜLLER.

Witnesses:
  ERNEST F. EHRHARDT,
  HEINRICH FINMANN.